United States Patent Office 3,391,952
Patented July 9, 1968

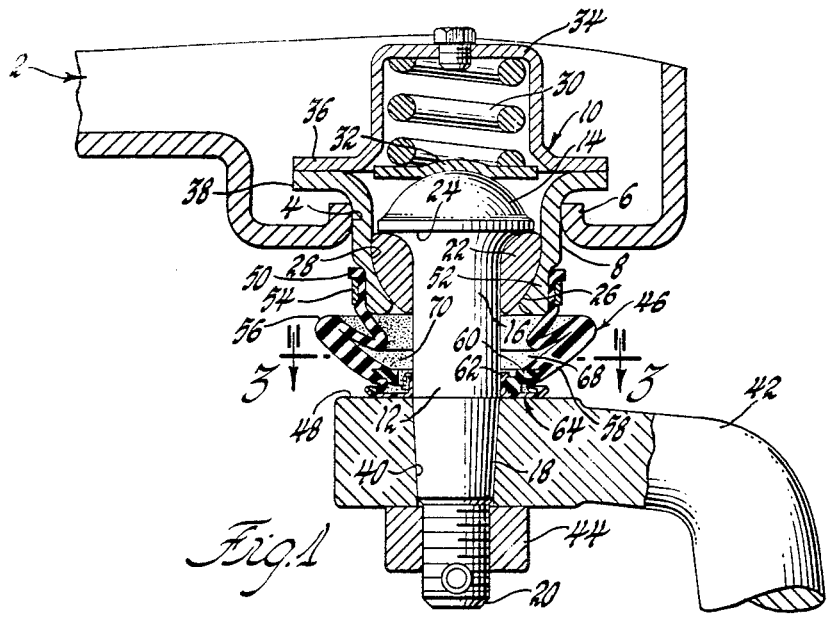
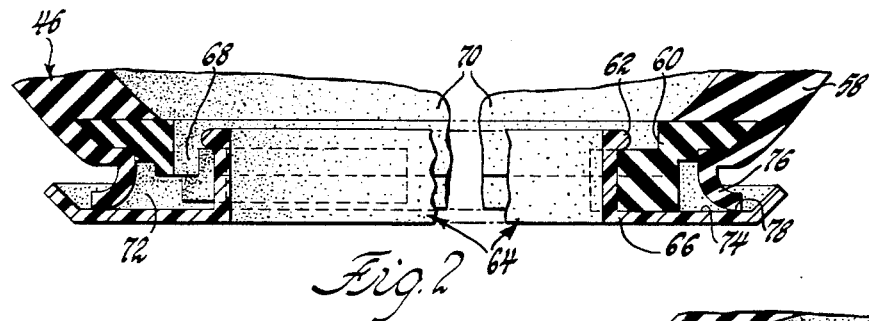
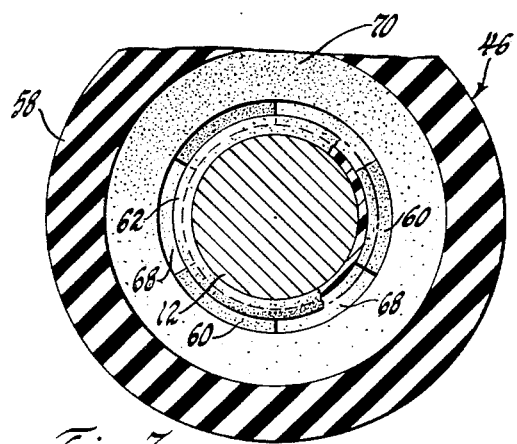
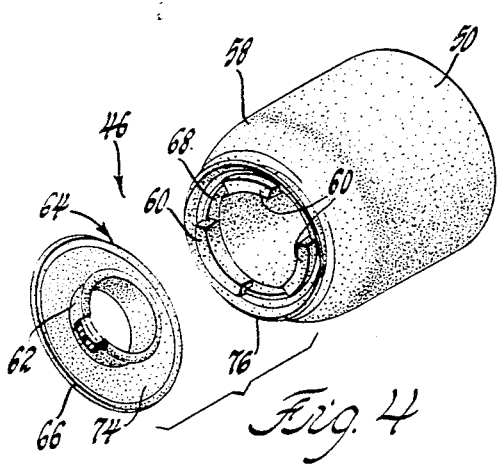

3,391,952
LUBRICANT PURGING SEALED BALL
JOINT ASSEMBLY
Philip B. Zeigler, Saginaw, Mich., assignor to General Motors Corporation, Detroit, Mich., a corporation of Delaware
Filed Nov. 4, 1963, Ser. No. 321,137
7 Claims. (Cl. 287—90)

This invention relates to ball joint assemblies and more particularly to permanently lubricated assemblies of the type adapted for use in vehicle suspension.

The present invention is concerned primarily with the provision of suspension ball joints of the type which are provided with an initial lubricant charge and thereafter normally require no periodic service lubrication.

In the prior art, the typical ball joint assembly has been provided with a conventional lubricant fitting and which enables periodic recharging of the lubricant cavity during the service life of the vehicle. Experience has shown, however, that the need for service lubrication stems from gradual loss of lubricant or contamination of the lubricant medium rather than any significant deterioration of its lubricating qualities. In consequence, it has been recognized for some time that by providing efficient seal means between the juncture of the ball stud and the casing in which it is disposed, the lubricating qualities of the initial charge could be maintained through an indefinite period of service operation.

An object of the present invention is to provide an improved ball joint assembly.

Another object is to provide a ball joint assembly incorporating flexible seal means which enable fully charging the lubricant cavity thereof irrespective of any climactic changes which the assembly may be subjected to during service operation.

A further object is to provide an assembly of the stated character wherein the seal incorporates means for automatically purging the lubricant cavity without destroying the effectiveness of the seal.

A still further object is to provide an assembly of the type described in which the purging means is constructed and arranged so as to yield readily to pressure exerted by the lubricant and yet readily restore effective sealing upon dissipation of excessive pressure.

Yet another object is to provide an arrangement of the stated character wherein the seal means is totally uneffected by angular inclination or relatively rotary movement of the ball joint assembly through its normal range of operation.

These and other objects, advantages and features of the invention will become more fully apparent as reference is had to the accompanying specification and drawing wherein:

FIGURE 1 is an enlarged fragmentary elevational view, partly in section, illustrating a ball joint assembly embodying the invention, and showing the relation thereof with associated parts of a vehicle suspension;

FIGURE 2 is a greatly enlarged fragmentary elevational view, partly in section, illustrating the form and arrangement of seal means for the assembly according to the invention;

FIGURE 3 is a view looking in the direction of arrows 3—3 of FIGURE 1; and

FIGURE 4 is an exploded perspective view of the flexible seal assembly shown in FIGURE 1, one of the parts thereof being rotated 90° from the plane normally occupied.

Referring now to the drawing and particularly FIGURE 1, there is shown a ball joint suspension assembly in which the reference numeral 2 designates the outer extremity of a conventional suspension control arm. The outer end of control arm 2 is formed with an eye 4 bounded by a circumferential flange portion 6. Press fitted or otherwise secured in eye 4 is the socket portion 8 of a ball joint assembly 10. Assembly 10 includes a ball stud 12 having an upper parti-spherical head portion 41, an intermediate cylindrical shank portion 16, a lower tapered portion 18, and a terminal threaded portion 20. A sintered metal parti-spherical bearing element 22 surrounds shank 16 and abuts upwardly against the thrust surface 24 formed on head 14. The outer semi-spherical surface 26 of element 22 engages a corresponding semi-spherical inner wall portion 28 formed in socket 8 near the lower extremity thereof. Stud 12 and element 22 are maintained in operating relationship with socket 8 by a spring 30 and bearing plate 32 disposed between head 14 and an inverted cup-shaped member 34. The flanges 36 and 38 of socket 8 and cup-shaped member 34 are secured together, as by welding, to provide a leakproof juncture therebetween.

Intermediate tapered portion 18 of stud 12 extends into a corresponding tapered bore 40 formed in wheel knuckle 42 and is drawn into locking engagement therewith by a nut 44 which threadably engages the threaded terminal portion 20.

In accordance with the general features of the invention, an annular elastomeric seal assembly 46 is disposed in surrounding relation with the shank portion 16 between the lower end of socket 8 and the upper face 48 of wheel knuckle 42. As seen in FIGURE 1, the upper end 50 of seal assembly 46 surrounds a reduced diameter pilot portion 52 on the lower end of socket 8 and is clamped in fluid tight relationship therewith by an encircling band 54. As seen best in FIGURE 4, prior to assembly, seal assembly 46 assumes a generally cylindrical configuration, the axial length of which is considerably in excess of the vertical distance between pilot portion 52 and face 48. However, when the stud 12 is secured to knuckle 42 in the assembled relation shown in FIGURE 1, the cylindrical wall of the seal is caused to assume an accordion-like convolution 56 which exerts substantial yieldable axial pressure against the face 48 of knuckle 42.

According to one feature of the invention, the lower portion 58 of seal 46 gradually increases in cross section and turns radially inwardly. Embedded in the radially inward extremity thereof is a circumferentially segmented ring portion 60 adapted for snap-on engagement with the outside diameter of neck portion 62 of a spool-like plastic bearing ring 64. Bearing ring 64 is formed with an inside diameter which closely surrounds the outside diameter of the lower extremity of shank 16 and includes a radially extending base flange portion 66 which is maintained in abutting bearing engagement with the face 48 of wheel knuckle 42 by the yieldable axial pressure exerted by seal convolution 56.

As will be evident from FIGURES 2 and 3, the segmented form of ring 60 provides a plurality of circumferentially spaced arcuate gaps 68 between the interior 70 of the ball joint assembly and the annular space 72 between segmented ring 60 and the upper surface 74 of the base flange 66 through which lubricant contained within the interior may pass. However, in accordance with the principal feature of the invention, the lower portion 58 of seal 46 includes an integral circumferential lip portion 76 which surrounds ring 60 and extends downwardly therefrom. Therefore, when the ring 64 is disposed in assembled relation with seal 46, th lip 76 is biased into engagement with the surface 74 of base flange 66 to form a sealing margin 78 extending completely around the annular space 72. Therefore, under normal conditions of operation, the lubricant charge contained within the interior of the ball joint assembly is prevented from emerging from space 72 into atmosphere by the marginal seal. However, in the event of fluid expansion such as might occur during high temperature operation, the hydraulic pressure resulting from lubricant expansion operates to radially displace the lip 76 away from surface 74 until the pressure is relieved. Thereafter, elastic memory of lip 76 restores the sealing margin 78 and prevents further loss of lubricant charge. In consequence, a lubricant charge consistent with the greatest temperature extremity at which the vehicle will be subjected is permanently retained within the ball joint assembly while the automatic purging necessary to normalize the lubricant charge is effected without risk of rupturing the flexible seal 46.

According to another feature of the invention, the lower extremity of sealing lip 76 curves radially outwardly as it approaches the surface 74 of base flange 66 so that it readily yields to pressure within the assembly but tends to exert an increasing sealing force if subjected to external pressure. Consequently the possibility of entrance of externally originating contamination is virtually precluded.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. A lubricant purging sealed ball joint assembly comprising, an apertured socket, a ball stud tiltable and rotatable in said socket including a shank portion extending through said socket, a member secured to said shank portion including a bearing surface lying in a plane normal to the axis of said shank, a bearing ring embracing said shank and axially abutting said bearing surface, a flexible annular seal surrounding sand shank and extending between said socket and bearing ring, means connecting one end of said seal in surrounding engagement with said socket, means forming a reduced diameter segmented ring at the other end of said seal adapted for snap-on engagement with said bearing ring, and a flexible circumferential lip formed on said seal radially outwardly of said segmented ring resiliently biased against said bearing ring to form a one-way sealing margin.

2. A lubricant purging sealed ball joint assembly comprising, an apertured socket, a ball stud tiltable and rotatable in said socket including a shank portion extending through said socket, a knuckle member secured to said shank portion including a bearing surface lying in a plane normal to the axis of said shank, a bearing surface, aing said shank and axially abutting said bearing surface, a flexible annular seal surrounding said shank and extending between said socket and bearing ring, means connecting one end of said seal in surrounding engagement with said socket, means forming a reduced diameter segmented ring at the other end of said seal adapted for snap-on engagement with said bearing ring, and a flexible circumferential lip formed on said seal radially outwardly of said segmented ring resiliently biased against said bearing ring to form a radially outwardly displaceable sealing margin.

3. A lubricant purging sealed ball joint assembly comprising, an apertured socket, a ball stud tiltable and rotatable in said socket including a shank portion extending through said socket, a knuckle member secured to said shank portion including a bearing surface lying in a plane normal to the axis of said shank, a low friction plastic bearing ring embracing said shank and axially abutting said bearing surface, a flexible annular seal surrounding said shank and extending between said socket and bearing ring, means connecting one end of said seal in surrounding engagement with said socket, means forming a reduced diameter segmented ring at the other end of said seal adapted for snap-on engagement with said bearing ring, and a flexible circumferential lip formed on said seal radially outwardly of said segmented ring resiliently biased against said bearing ring to form a sealing margin which is displaceable responsive to pressure differential between the interior and exterior of said assembly.

4. A lubricant purging sealed ball joint assembly comprising, an apertured socket, a ball stud tiltable and rotatable in said socket including a shank portion extending through said socket, a knuckle member secured to said shank portion including a bearing surface lying in a plane normal to the axis of said shank, a low friction plastic bearing ring embracing said shank and axially abutting said bearing surface, a flexible annular seal surrounding said shank and extending between said socket and bearing ring, means connecting one end of said seal in surrounding engagement with said socket, means forming a reduced diameter segmented ring at the other end of said seal adapted for snap-on engagement with said bearing ring, and a flexible circumferential lip formed on said seal radially outwardly of said segmented ring resiliently biased against said bearing ring to form a sealing margin displaceable responsive to expansion of lubricant within said assembly.

5. A lubricant purging sealed ball joint assembly comprising, an apertured socket, a ball stud tiltable and rotatable in said socket including a shank portion extending through said socket, a knuckle member secured to said shank portion including a bearing surface lying in a plane normal to the axis of said shank, a low friction plastic bearing ring embracing said shank and axially abutting said bearing surface, a flexible annular seal surrounding said shank and extending between said socket and bearing ring, means connecting one end of said seal in surrounding engagement with said socket, means forming a reduced diameter segmented ring at the other end of said seal adapted for snap-on engagement with said bearing ring, and a flexible circumferential lip formed on said seal radially outwardly of said segmented ring resiliently biased against said bearing ring to form a sealing margin displaceable responsive to expansion of lubricant within said assembly, said lip engaging said ring in a manner whereby pressure exerted externally thereof tends to augment said resilient bias.

6. The structure set forth in claim 5 wherein said resilient bias results from displacement of said lip from its relaxed position.

7. The structure set forth in claim 3 wherein said bearing ring includes a cylindrical neck portion embracing said shank and a radial flange portion abutting said bearing surface, said neck portion having a bead portion formed at the upper end thereof overlapping said segmented ring.

References Cited
UNITED STATES PATENTS

| | | |
|---|---|---|
| 2,280,634 | 4/1942 | Flumerfelt. |
| 2,304,732 | 12/1942 | Flumerfelt. |
| 2,397,464 | 4/1946 | Booth. |

EDWARD C. ALLEN, *Primary Examiner.*
CARL W. TOMLIN, *Examiner.*
ANDREW V. KUNDRAT, *Assistant Examiner.*

UNITED STATES PATENT OFFICE
CERTIFICATE OF CORRECTION

Patent No. 3,391,952                                            July 9, 1968

Philip B. Zeigler

It is certified that error appears in the above identified patent and that said Letters Patent are hereby corrected as shown below:

Column 2, line 6, "41" should read -- 14 --; line 68, "th" should read -- the --. Column 3, line 36, "sand" should read -- said --; lines 50 and 51, "normal to the axis of said shank, a bearing surface, a ing said shank and axially abutting said bearing surface, a" should read -- normal to the axis of said shank, a bearing ring embracing said shank and axially abutting said bearing surface, a --.

Signed and sealed this 16th day of December 1969.

(SEAL)
Attest:

Edward M. Fletcher, Jr.                              WILLIAM E. SCHUYLER, JR.
Attesting Officer                                           Commissioner of Patents